T. F. CRARY.
METHOD OF MANUFACTURING SHELLS FOR RAIN WATER CUT-OFFS.
APPLICATION FILED MAR. 23, 1907.
903,959.
Patented Nov. 17, 1908.
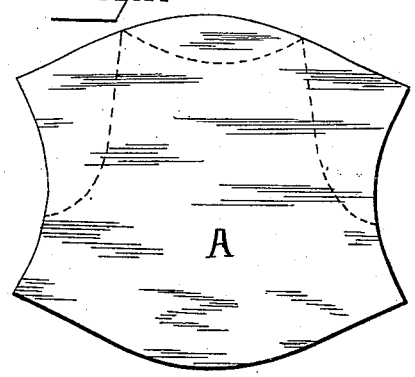
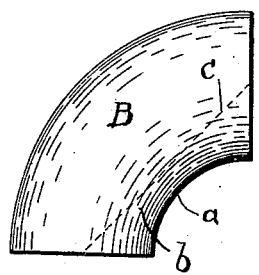
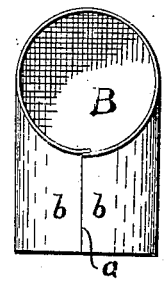
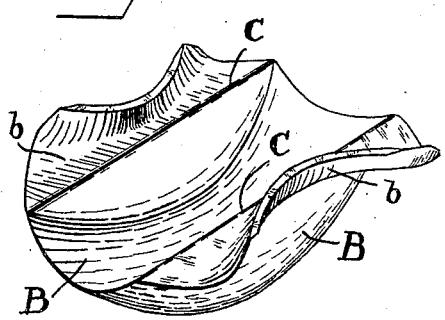
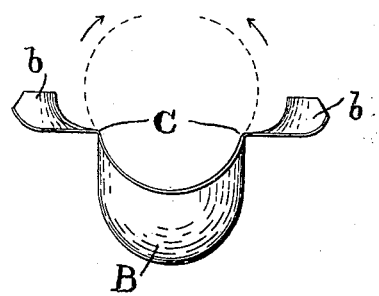
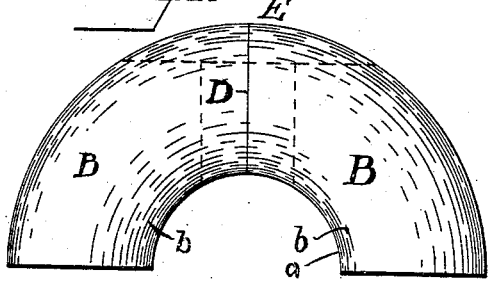
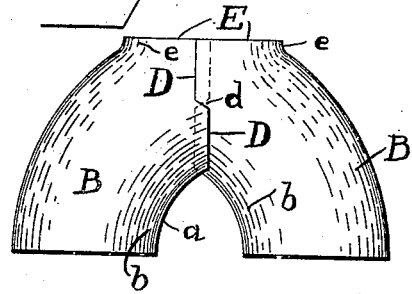
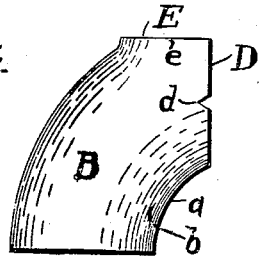
Witnesses.
Homer Bradford.
T. LeBeau.
Inventor:
Thomas F. Crary
by O. Spengel atty

UNITED STATES PATENT OFFICE.

THOMAS F. CRARY, OF MIDDLEPORT, OHIO.

METHOD OF MANUFACTURING SHELLS FOR RAIN-WATER CUT-OFFS.

No. 903,959.   Specification of Letters Patent.   Patented Nov. 17, 1908.

Application filed March 23, 1907. Serial No. 364,091.

*To all whom it may concern:*

Be it known that I, THOMAS F. CRARY, a citizen of the United States, and residing at Middleport, Meigs county, State of Ohio, have invented a certain new and useful Method in the Manufacture of Shells for Rain-Water Cut-Offs; and I do declare the following to be a clear, full, and exact description thereof, attention being called to the accompanying drawing, with the reference characters marked thereon, which forms also a part of this specification.

This invention consists of the particular method of manufacturing shells for so-called rain-water cut-offs as hereinafter described and claimed and as illustrated in the accompanying drawing, in which:—

Figure 1 shows approximate shape of a blank out of which a part, required in the production of the shell is formed. Fig. 2, is a side-view of such part completed. Fig. 3, is an end-view thereof. Fig. 4, in a perspective-view shows shape of the article at an intermediate stage of manufacture. Fig. 5, is an end-view of the same. Fig. 6, shows two of such parts brought together to form a shell for a rain-water cut-off. Fig. 7, shows such a shell complete. Fig. 8, shows one of these complementary parts or units slightly modified.

My rain-water cut-off shell is made of two elbow-shaped, primary articles of manufacture as shown in Fig. 2, and two of which, serving as units, are placed together as shown in Fig. 6, to form the shell. These units are each made out of a blank of an outline as shown approximately in Fig. 1, and which after formed to shape produces an article as shown in Figs. 2 and 3, there being only one seam on its inner or concave side as shown at $a$, where the side is the shortest.

In producing this article the blank, by means of suitable press-dies, is first formed into a preliminary shape as shown in Figs. 4 and 5, the resulting product containing the outer or convex part of the unit designated by B, which part is at once pressed to a substantially semi-tubular curve, and simultaneously also to an elbow-shaped curve. From the edges C, C, of this depressed part B, there extend at this stage of the manufacture, outwardly and in opposite direction, two flap-shaped parts $b$, $b$, which are intended to form the inner or concave side of the primary article and which parts, in order to form such side, are in the succeeding operation brought around and towards each other as shown in dotted lines in Fig. 5, and until their free edges come together as shown in Fig. 3, after which these edges are connected by formation of a seam $a$. The dividing line between these two parts B, and $b$, of this preliminary shape, and which parts I have termed outer or convex part, and inner or concave part with reference to their relation to the completed article, is indicated at C, in Fig. 2, and is coincident with the edges C, C, as shown in Figs. 4 and 5. These lines disappear however completely in the finished article as will be readily seen in Figs. 2, 3, 6, 7, and 8. By placing now two of such units or sections end-wise together as shown in Fig. 6, and by connecting them thereat by a suitable seam D, and by removing part of the metal from the apex of the resulting structure to provide an opening at E, as shown in dotted lines, a shell, or housing for a rain-water cut-off is produced. It is not necessary that these units be of a complete quarter-turn, and metal may be saved by making them shorter, the metal being removed from the ends to be connected and as shown by the vertical dotted lines in Fig. 6. Fig. 7, shows a structure formed of two such units the metal not required having been removed from them. In such case, this surplus metal is of course removed already in the blank and this latter is also modified accordingly, the dotted lines in Fig. 1, showing about the lines on which the metal, superfluous in this case, is cut. The intermediate shape resulting in this formation and as shown in Fig. 4, would also appear correspondingly modified. Fig. 8, shows the unit resulting when produced on such a modified shape. The seam at D, may be formed in any suitable manner. The opposite complementary edges to be engaged are usually notched out as shown at $d$, and so brought together that part of one edge overlaps part of the other complementary edge as best shown in Fig. 7. There is also in such cut-offs a flange $e$, provided around this opening E, to permit attachment of other parts necessary in the construction of cut-offs.

Having described my invention, I claim as new:

1. The method for producing a cut-off shell which when completed contains the three requisite openings adapted to receive the necessary pipe attachments, said method consisting of providing two tubular, complementary curved sections which are each made out of one integral sheet of metal which sheets are suitably shaped to form two similar blanks, of producing in the middle portion of each blank a longitudinal depression which is substantially semi-circular transversely and formed longitudinally between its ends to contain the outwardly curved or convex part of the tubular members, after which in each of the blanks the parts remaining on each side of the depression first formed, are bent inwardly and towards each other so as to close over this depression, thus producing the inner part of each curved member, the edges of which parts are now seamed together, the two members so produced being finally connected at one of their open ends, there being also an opening provided at this point of connection and in the apex of the resulting structure.

2. The method of producing a cut-off shell which, when completed, contains the three requisite openings adapted to receive the necessary pipe-attachments, said method consisting of constructing two tubular complementarily curved sections which are each made out of an integral, suitably shaped blank, the middle portion of each of which is depressed lengthwise to form the outwardly curved or convex part of each curved section, the parts remaining on each side of this depressed portion, after being closed over said portion, being connected to each other at their free edges, thereby producing the inner or concave part of each curved section and completing the same in a manner such that each contains one of the pipe-attaching openings and half of the other openings; presenting also on its concave side edges complementary to similar edges on the other section, the cut-off shell being completed by connecting its two complementary sections at these complementary edges on each section.

In testimony whereof, I hereunto affix my signature in the presence of two witnesses.

THOMAS F. CRARY.

Witnesses:
J. B. DOWNING, Jr.,
JENNIE SCHRÜBER.